United States Patent [19]

Rager

[11] Patent Number: 4,529,493

[45] Date of Patent: Jul. 16, 1985

[54] APPARATUS FOR THE ELECTROLYTIC DRILLING OF PRECISION HOLES

[75] Inventor: Konrad Rager, Pfaffenhofen, Fed. Rep. of Germany

[73] Assignee: MTU Motoren-und Turbinen-Union Muenchen GmbH, Munich, Fed. Rep. of Germany

[21] Appl. No.: 628,663

[22] Filed: Jul. 6, 1984

[30] Foreign Application Priority Data

Jul. 28, 1983 [DE] Fed. Rep. of Germany ....... 3327220

[51] Int. Cl.³ .............................. B23P 1/02; B23P 1/12
[52] U.S. Cl. ............................... 204/224 M; 204/279; 204/297 R; 204/129.55
[58] Field of Search .............. 204/224 M, 129.55, 279, 204/297 R

[56] References Cited

U.S. PATENT DOCUMENTS

| | | | |
|---|---|---|---|
| 3,120,482 | 2/1964 | Williams | 204/224 M |
| 3,196,093 | 7/1965 | Williams | 204/129.55 |
| 3,696,014 | 10/1972 | Goodard et al. | 204/224 M X |
| 4,043,883 | 8/1977 | Puhr-Westerheide | 204/129.55 X |

FOREIGN PATENT DOCUMENTS 2135207  7/1970  Fed. Rep. of Germany .
2538652  6/1979  Fed. Rep. of Germany .

Primary Examiner—Donald R. Valentine
Attorney, Agent, or Firm—W. G. Fasse; D. H. Kane, Jr.

[57] ABSTRACT

An apparatus for the electrolytic drilling of precision holes into a work piece surface which extends at an acute angle to the drilling direction, has one tubular electrode for each hole to be drilled. Each electrode directs an electrolyte stream in the desired direction. In order to assure a proper drilling and to protect the work piece outside the holes to be drilled, a covering body is located to cover the work piece surface through which the holes are to be drilled. The covering body has a surface which closely hugs or forms an interface with the work piece surface, and another surface which extends perpendicularly to the drilling direction so that the drilling begins through the covering body which then forms a guide for the electrode and for the return flow.

7 Claims, 3 Drawing Figures

APPARATUS FOR THE ELECTROLYTIC DRILLING OF PRECISION HOLES

FIELD OF THE INVENTION

The invention relates to an apparatus for the electrolytic drilling of precision holes, including a fixture which permits that the drilling direction extends at an actute angle to the surface of the work piece. The holes are being drilled by means of one or more tubular electrodes through which a stream of electrolyte is directed at the work piece.

DESCRIPTION OF THE PRIOR ART

The principle of electrolytic precision drilling has been disclosed e.g., by German Patent Publication (De-OS) No. 2,135,207. It has been found, however, that difficulties exist in electrolytically drilling holes in a direction enclosing an acute angle with the work piece surface through which the hole must be drilled. Such difficulties involve material removal from the work piece in places where no material removal is intended. This is so for holes which do not extend at a right angle with the work piece surface or which do not include an angle of at least 50° or more with the surface of the work piece. Thus, the known electrolytic precision drilling methods are not suitable in those instances because especially in the area of the blunt forward edges of such holes material is removed by an uncontrolled electrolytic action such that the diameter of the holes is excessively widened in the surface area of the work pieces.

U.S. Pat. No. 4,043,883, corresponding to German Patent (DE-PS) No. 2,538,652, discloses an electrolytic precision drilling fixture, wherein during the drilling operation a guide block rests on the surface of the work piece for forming a conical angular space including the machining area. The angular space is intended to cause an orderly return flow of the electrolyte for preventing an excessive washout at the edge of the hole on the surface of the work piece. While it has been shown that this previously disclosed drilling fixture will indeed improve the edge of the hole, it still requires a very accurate adjustment of the guide block. At least under mass production conditions such accurate adjustment will not always be achieved with certainty.

OBJECTS OF THE INVENTION

In view of the above it is the aim of the invention to achieve the following objects singly or in combination:

to provide an improved precision drilling fixture which will be easy to operate and therefore is suitable especially for mass production work;

to simplify the manufacture of such fixture;

to make sure that the fixture will prevent an undesirable washout at the edge of the hole, regardless of the inclination of the centerline drilling direction of the hole relative to the surface of the work piece; and to assure a smooth, well defined edge in the work piece surface around the hole, regardless of the drilling direction.

SUMMARY OF THE INVENTION

The apparatus of the present invention has a covering device including a cover block which during the drilling operation is clamped onto the work piece to cover the area of the hole to be drilled. The cover block has a first surface which complements and closely hugs the surface contour of the work piece, and a second or starting surface extending approximately normally to the centerline of the tool. When this fixture is clamped to the work piece surface, the cover block is first perforated by the drilling action before the stream of electrolyte impinges upon the surface of the work piece. The so drilled hole in the cover block, therefore, guides the electrodes as the hole is being drilled, and the subsequent return flow of the electrolyte will be completely coaxial to the drilling direction which extends with an acute angle relative to the work piece surface. These features assure that the hole or holes are drilled at an acute angle with a smooth well defined edge, that is, without steps or washout. Clamping the cover block in place on the surface of the work piece is a simple and fast operation.

BRIEF FIGURE DESCRIPTION

DETAILED DESCRIPTION OF PREFERRED EXAMPLE EMBODIMENTS AND OF THE BEST MODE OF THE INVENTION

Figure 1:
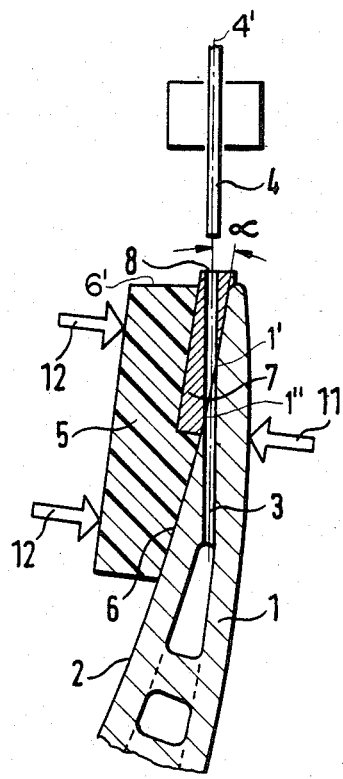
FIG. 1 is a schematic cross-section through a drilling apparatus according to the invention.

The work piece 1 illustrated in the apparatus of FIG. 1 is a turbine blade of which only the aft section with its sharp trailing edge is shown. Actually the trailing edge is shown somewhat rounded due to the enlarged illustration. The turbine blade 1 has a concave surface 2 into which a hole 3 is to be drilled approximately in the direction of the longitudinal axis of the blade. The hole is to be drilled by using an electrolytic precision drilling method.

The drilling direction 4' of the hole 3 encloses with the surface 2 of the work piece an acute angle α of about 10°. To assure well defined edges around the entrance into the hole 3 in the surface 2 of the work piece 1, especially at the trailing edge 1' and at the location 1" under these drilling conditions, a cover body 5 is secured to the surface 2 of the work piece 1 by a clamping device, schematically indicated by the arrows 11, 12. The cover body or block 5 is clamped to the concave surface 2 of the work piece 1 so that the first surface 6 which is complementary in its shape to the surface 2 closely matches the surface 2. Preferably the cover block or body 5 is made of synthetic resin and it has a second surface 6' extending perpendicularly to the drilling direction 4'. Thus, the drilling initially passes through the body 5. However, it is preferable to provide the body 5 with a replaceable metal plate 7 arranged in the area of the hole 3 to be drilled through the surface 2 of the work piece 1. Thus, drilling takes place first through the plate 7.

The surface 6 of the cover block 5 mating with the surface 2 of the work piece 1 and the respective surface of the metal plate 7 also mating with the surface 2 are accurately adapted to the work piece surface 2. This surface matching is preferably achieved by copy-molding the cover block 5 and a metal plate 7 therein off the surface 2 of the work piece 1. The metal plate 7 also has a second surface 8 extending about normal to the longitudinal centerline or drilling direction 4' of the hole 3 to be produced, or normal to the longitudinal centerline of the tubular electrode 4. The tubular electrode 4 is positioned such that for drilling the hole 3, the metal plate is necessarily perforated first, whereby the tubular electrode 4, before reaching the surface 2 of the work piece 1, is inside a hole extending through the metal plate 7. Thus, the metal plate 7 may be replaced while the cover 5 is used repeatedly.

The cover block 5, as shown in FIG. 1, may be made entirely of a synthetic plastic material or it may be reinforced with metal elements.

Although the fixture is here described in connection with the drilling of a single hole 3, the turbine blade 1 has a plurality of such cooling holes arranged in rows, whereby the holes are drilled simultaneously. For this purpose, the cover block 5 and the metal plate 7 are deep enough as viewed perpendicularly to the plane of the drawing to cover all surfaces through which the drilling is to take place.

The replaceable metal plate 7 needs to be just large enough to accommodate a perforation of the diameter intended and of the length portion of the hole required to be covered. In other respects the metal plate is a low-cost throw-away item, preferably punched from sheet metal. The material to use for the metal plate, or for the cover block in the area of the starting surface, is an acid-resistant steel, preferably X 10 CrNiTi 189.

If the cover block 5 is made of an elastic plastic material, preferably epoxide resin, as mentioned, the cover block 5 can readily be copy-molded off the surface 2 of the work piece 1, so that the surface 6 of the cover block 5 conforms accurately to the surface contour 2 of the work piece 1. Thus, when the cover block 5 is clamped to the work piece 1, there will not be any clearance between the two surfaces 2 and 6.

Figure 2:
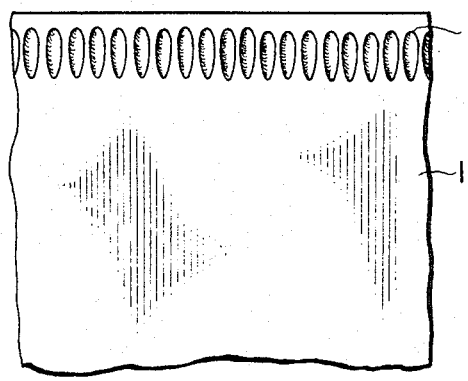
FIG. 2 is based on a photograph taken substantially in the direction of arrows 12 in FIG. 1 (cover body removed) and showing the edge of electrolytically drilled holes, whereby the present fixture has been used.
Figure 3:
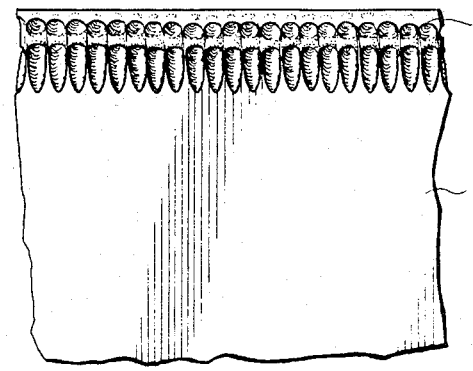
FIG. 3 is based on a photograph taken as in FIG. 2, but after a drilling operation without any protective fixture.

FIGS. 2 and 3 show a side view along arrows 12 of FIG. 1 on to the trailing edge of a turbine blade 1. The trailing edge 1' is shown in FIGS. 2 and 3. In FIG. 2 the present apparatus was used for the electrolytic drilling. In FIG. 3 no drilling aids were used. The hole edges in FIG. 2 achieved according to the invention and sharp edged and well defined. The hole edges in FIG. 3 are ragged and especially near the trailing edge 1', they even penetrate into the next adjacent hole. The invention avoids these problems.

Although the invention has been described with reference to specific example embodiments, it will be appreciated that it is intended to cover all modifications and equivalents within the scope of the appended claims.

What is claimed is:

1. An apparatus for the electrolytic drilling of precision holes into a work piece in a drilling direction which extends at an acute angle relative to a work piece surface, comprising tubular electrode means for directing an electrolyte stream at said work piece in said drilling direction, work piece covering means having a first surface complementary to said work piece surface through which said holes are to be drilled and a second surface extending perpendicularly to said drilling direction for first drilling through said covering means, and clamping means for releasably securing said covering means to said work piece surface prior to a drilling operation, and wherein said covering means comprise a replaceable insert member and a recess for receiving said insert member, said recess being located in said covering means in such a position that said insert member forms part of said first and second surfaces of said covering means, whereby said insert member is located in a drilling path.

2. The apparatus of claim 1, wherein said insert member is made of acid resistant steel, such as X 10 CrNiTi 189.

3. The apparatus of claim 1, wherein said covering means is made of an elastic synthetic material such as epoxy resin, and wherein said insert member is made of acid resistant steel inserted into said covering means.

4. The apparatus of claim 1, wherein said covering means is made of acid resistant steel, such as X 10 CrNiTi 189.

5. An apparatus for the electrolytic drilling of precision holes into a work piece in a drilling direction which extends at an acute angle relative to a work piece surface, comprising tubular electrode means for directing an electrolyte stream at said work piece in said drilling direction, work piece covering means made of an elastic synthetic material having a first surface complementary to said work piece surface through which said holes are to be drilled and a second surface extending perpendicularly to said drilling direction, said covering means initially being free of any drilling hole means for first drilling through said covering means before drilling into said work piece, and clamping means for releasably securing said covering means to said work piece surface prior to a drilling operation.

6. The apparatus of claim 5, wherein said covering means comprise a replaceable insert member which is initially free of any hole means, and a recess for receiving said insert member, said recess being located in said covering means in such a position that said insert member forms part of said first and second surfaces of said covering means, whereby said insert member is located in a drilling path for first drilling through said insert member before drilling through said work piece.

7. The apparatus of claim 6, wherein said insert member is made of acid resistant steel, such as X 10 CrNiTi 189.

* * * * *